May 25, 1943. R. C. FISHER Re. 22,321

ELECTRICAL MUSICAL INSTRUMENT

Original Filed July 20, 1932 4 Sheets-Sheet 1

INVENTOR
Raymond C. Fisher
BY Munson H. Rand.
ATTORNEY

ELECTRICAL MUSICAL INSTRUMENT

Original Filed July 20, 1932 4 Sheets-Sheet 2

INVENTOR
Raymond C. Fisher
BY Munson H. Lane
ATTORNEY

May 25, 1943. R. C. FISHER Re. 22,321

ELECTRICAL MUSICAL INSTRUMENT

Original Filed July 20, 1932 4 Sheets-Sheet 3

INVENTOR
Raymond C. Fisher,
BY Thurston H. Lane.
ATTORNEY

INVENTOR:
Raymond C. Fisher
By Paul Bliven
Attorney

Reissued May 25, 1943 Re. 22,321

UNITED STATES PATENT OFFICE 22,321

ELECTRICAL MUSICAL INSTRUMENT

Raymond C. Fisher, Tacoma, Wash.

Original No. 2,055,719, dated September 29, 1936, Serial No. 623,639, July 20, 1932. Application for reissue March 14, 1938, Serial No. 195,850

34 Claims. (Cl. 84—1.17)

This invention relates to the art of producing musical tones by electrical means. It has application to musical instruments played manually or automatically by means of player rolls, or to both. Among manually played instruments, it has particular application to the keyboard type. It is, however, neither an organ nor a piano, but produces or originates its tones by means entirely distinct from those employed by either.

The objects of this invention are several. The first of these is to provide a musical instrument capable of producing, in certain of its forms, tones of a timbre closely resembling that of the piano, organ, and/or common orchestral instruments. It is capable of imitating not only sustained tones, but can also, for example, imitate the rather sudden onset and gradual dying away of a piano tone. At the same time, and in the same instrument, it can, moreover, create new tonal effects such as cannot be produced by any mechanical or pneumatic means. Its possibilities for the development of the music of the future are thus very great. It has been the history of music that musical composition and technique have progressed largely according to, and in response to, the invention of instruments for the performance of music.

Another object of the invention is to provide an instrument which can modulate a radio transmitter or transmit music by wire, without the intermediary, between instrument and ether, or instrument and wire, of a microphone. The advantages in freedom from room reverberation, unwanted sounds produced in the room where the microphone is located, improper balance between the various voices of an instrument due to unfavorable placing of the microphone relative to certain portions of the instrument, etc., are scarcely to be overrated. These difficulties arise particularly in rooms which have not been specially treated acoustically to make them suitable for broadcasting.

Another object is to provide an instrument which can, as has been said, be operated either manually or automatically.

A fourth object is to free the musician from the difficulties which arise when, as frequently occurs, his instrument "gets out of tune". It will appear later that, in the present invention, so long as the speed of the driving motor incorporated in it is held constant, which is not at all a difficult matter, the instrument cannot possibly "get out of tune". Also, the pitch relationship between any two tones which it is capable of producing must remain constant regardless of temperature, humidity, or age or fatigue of its parts, so long as they do not actually break. In the piano, as is well known, the pitch tends to drop with age, due to the stretching or slipping of the strings. The organ likewise changes in pitch with every change in temperature, and usually its various pipes do not all change by the same amount.

The invention has as a fifth object to make possible the building of an instrument which is simple, compact, low in first cost and maintenance expense, and light in weight, particularly as compared with the pipe organ. I believe that there is a need for such as instrument, particularly for installation in homes, hotels, cafes, undertaking establishments, and the like, and more especially in those already constructed wherein no provision has been made for an instrument having the bulk of a pipe organ.

The pipe organ has been called a "one-man orchestra". This is inaccurate insofar as the organ fails, as it generally does, in imitating accurately the tonal peculiarities of orchestral instruments. Nor is it an easy task to so construct the organ that it can accurately imitate them. The conditions under which the tone is produced being different in the original instrument and in the organ, and the reasons for the different tonal qualities of different types of organ pipes being imperfectly understood, the process of designing an organ pipe to have a certain desired tone quality is of necessity largely an experimental and empirical one. On the other hand, the instrument constructed according to this invention is capable of synthesizing any of a very wide variety of tone qualities out of the component partials which exist in the tone of the orchestral or other instrument which it is desired to imitate. This will be explained more in detail later. In addition, one instrument according to this invention is capable of taking the place of many instruments simultaneously, and can be constructed more cheaply than the many instruments it displaces.

It is possible to connect many keyboards with one such instrument, thus enabling a number of musicians to simultaneously play on the same instrument. Since the volume of sound associated with any one keyboard can be varied through very wide limits, it is possible, for example, for one musician, at one keyboard, to take the place of all the flutists and of all of their flutes, in a large symphony orchestra. In addition, and simultaneously, other musicians at other keyboards would be taking the place of other groups of instruments in the orchestra.

It is quite generally conceded that a melody which can be played, for example, on a flute, an oboe, or a saxophone, can be played more easily on a keyboard instrument, and that less skill is required for its execution on the latter. The present invention thus makes a comparatively unskilled musician, in effect, a flutist, an oboe player and a saxophone player, all three. Likewise a pianist or an organist may be able to nearly perfectly imitate the flute, almost without practice in such imitation.

The production, for laboratory and other uses, of alternating electric currents and voltages of accurately controllable frequency and wave form, is another purpose of this invention. It is well known to researchers in the electrical field that this has hitherto been a task of considerable importance, but one difficult or impossible to achieve, according to the degree of accuracy of wave form demanded.

It is well known (see Webster's Unabridged Dictionary, under the word "tone", in sense 2*a*), that sustained musical tones are characterized by their pitch, timbre, and intensity, and that their timbre is determined by the proportions of so-called partials which they contain. Hence a sustained musical tone of any desired timbre or quality can be synthesized by simultaneously producing several component sound waves of the proper relative pitches and intensities. In the present instrument, periodic variations of electric current or voltage are produced and, with or without intermediate electric circuits, are caused to operate a telephone receiver, usually a loudspeaking receiver, and often more than one.

It is by no means necessary that the loudspeaker which is operated be connected by wires with the part of the apparatus which originates the alternating currents and voltages. The latter could, for example, be used to modulate a radio telephone transmitter, in which case the loudspeaker might be a part of a radio receiver. Nevertheless, the primary purpose of the invention is the production of musical tones; that is, of tones characterized by definite pitch and timbre.

In brief, my invention contemplates the production of alternating electric currents and electromotive forces of a greater or less degree of complexity, which are subsequently amplified and caused to operate a loudspeaker or telephone receiver, which terms, as I use them throughout this application, include the electrostatic loudspeaker or receiver, the electrodynamic loudspeaker, the magnetic loudspeaker, the piezoelectric loudspeaker, and, in fact, all devices for converting or translating varying electric currents or voltages into sound waves. In addition, the invention includes means for controlling the volumes, the pitches, and the timbres of the various components comprising the sound.

I am well aware that United States Letters Patent for means designed for accomplishing generally similar ends have already been granted to others. I believe, however, that my invention has the advantages of a degree of simplicity, compactness and inexpensiveness of construction greater than are possessed by any of these other inventions whose musical possibilities are comparable. The simplicity of the variable condenser as a source of alternating electromotive force is mainly responsible for this. So far as I am aware, no one has ever before employed variable condensers for originating musical tones of a particular desired waveform, or, as may be better stated, of any prescribed waveform, (I do not mean to include in this statement the reproduction of musical tones) or of the electric currents which are their electric analogues. Electric currents and voltages are quite readily, cheaply and faithfully amplified by vacuum tube amplifiers of modern design, a fact which makes possible the utilization for musical purposes of the rather feeble voltages generated by variable condensers.

With the above and other objects and advantages in view, this invention has particular relation to certain novel features of construction, operation, arrangement of parts and methods of use, examples of which will be given in this specification and illustrated in the accompanying drawings, wherein.

Figure 6:
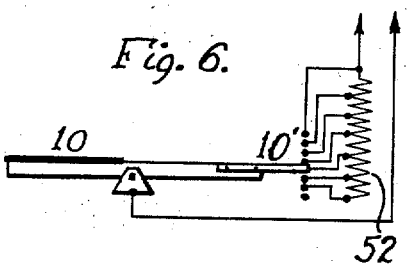
Figure 7:
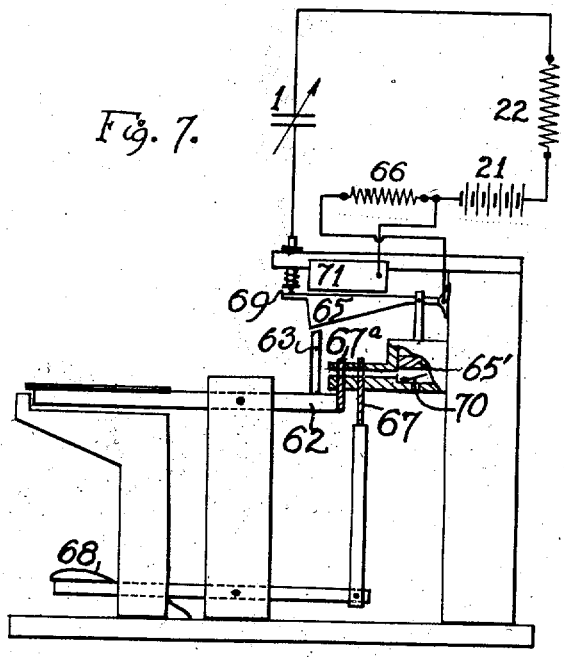
Figure 6A:
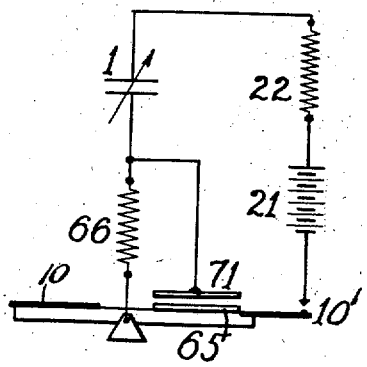
Figure 8:
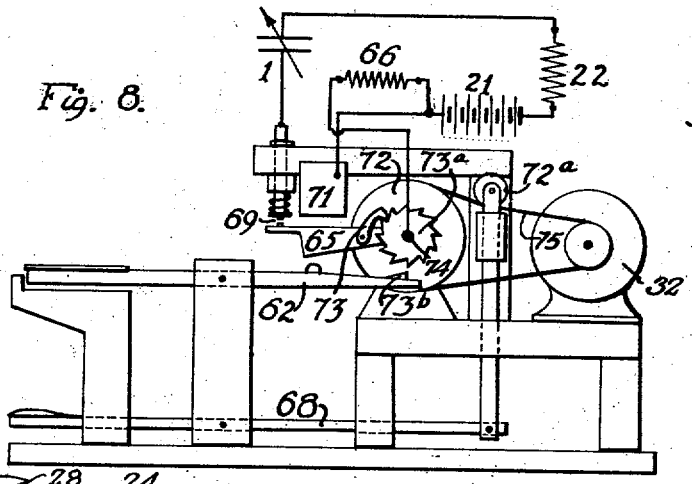
Figure 9:
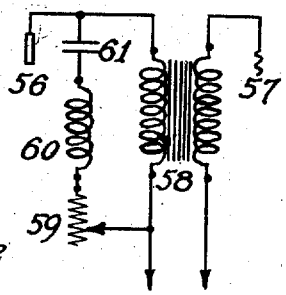
Figure 10:
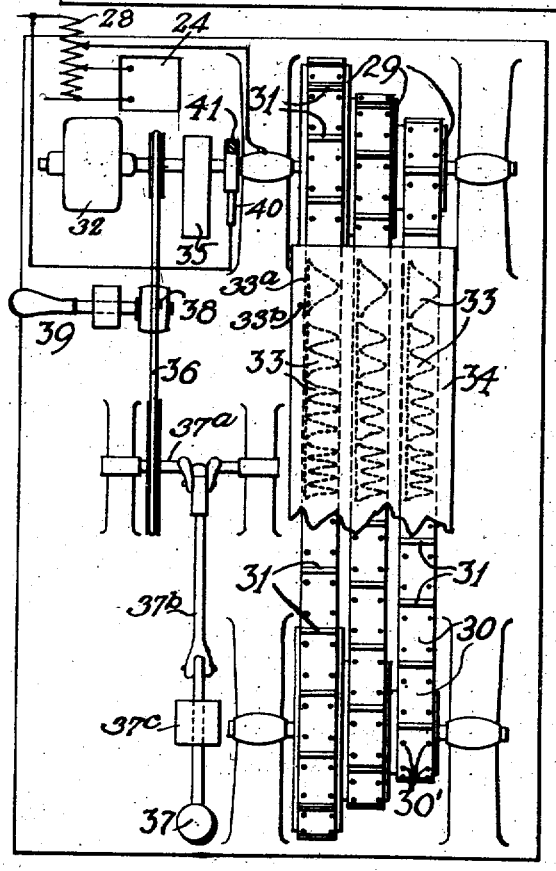
Figure 10A:
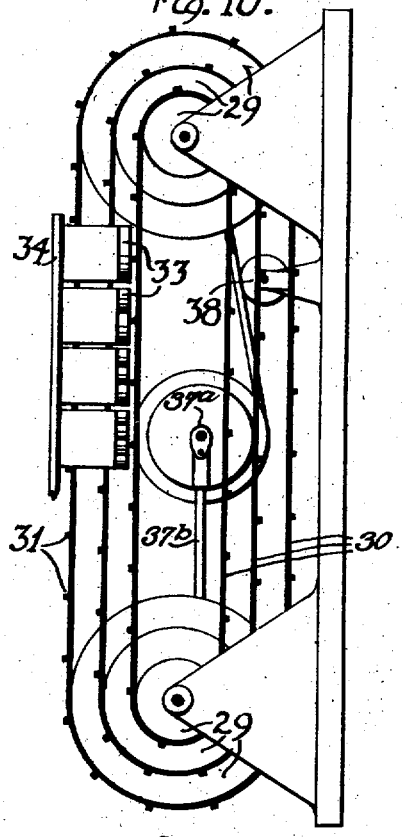

Figs. 6, $6^a$ and $6^b$ show schematically, means for controlling the rate at which the volume of sound increases to a maximum and again dies away, after a key of the instrument is pressed;

Figs. 7 and 8 illustrate still other ways of accomplishing roughly the same ends as does the circuit of Fig. 6;

Fig. 9 shows a type of volume control having certain advantages;

Fig. 10 illustrates in plan mechanical details showing the tone bands used when electrostatic means are used for the production of musical tones, together with the mechanism which drives them, the prime mover, and the speed-control apparatus.

Figure 11:
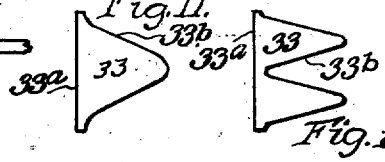
Figure 11A:
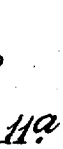
Figure 12:
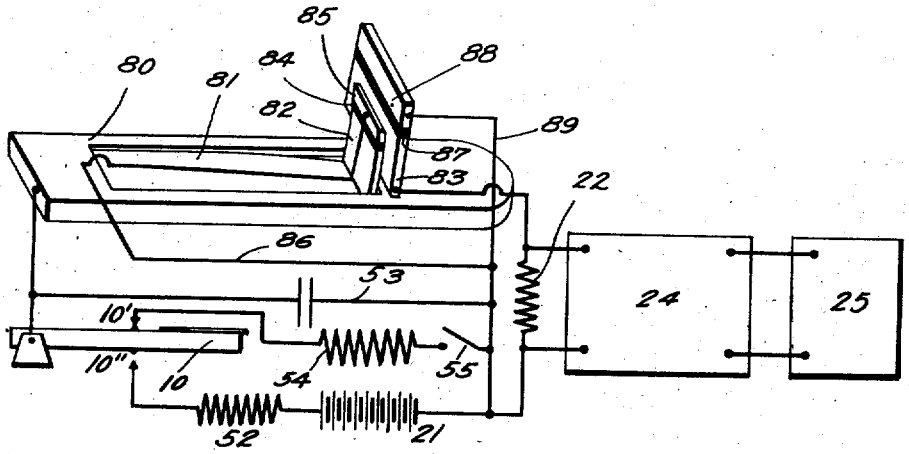

Fig. $10^a$ is a side elevation of the same parts;

Figs. 11 and $11^a$ show two forms of stator plates;

Fig. $11^b$ shows a variable condenser for producing irregular wave shapes;

Fig. 12 shows a condenser of a modified form illustrated diagrammatically at 1 in Fig. $6^b$.

Like numerals designate the same parts throughout the specification.

Figure 3:
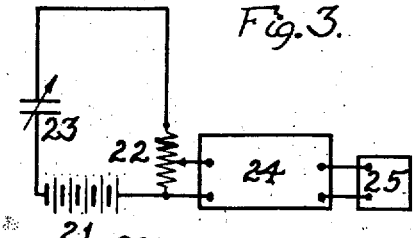
Fig. 3 shows a still further simplified schematic circuit, electrically equivalent to that of Fig. 1.

Referring to the circuit shown in Fig. 3, 21 is a source of unvarying electromotive force, such as a dry battery, 22 is a resistance, and 23 is an electrostatic condenser. If the capacitance of the condenser is caused to vary, the quantity of electricity stored in it will vary, and there will be a variation of negative reactance and current in the circuit and a voltage drop in the resistance. It is on a similar principle that the usual condenser microphone operates. The voltage drop in resistance 22 resulting from the current in it is applied to the input terminals of an amplifier 24. The electrical output energy of the amplifier is made to operate a telephone receiver or loudspeaker 25.

Figure 1:
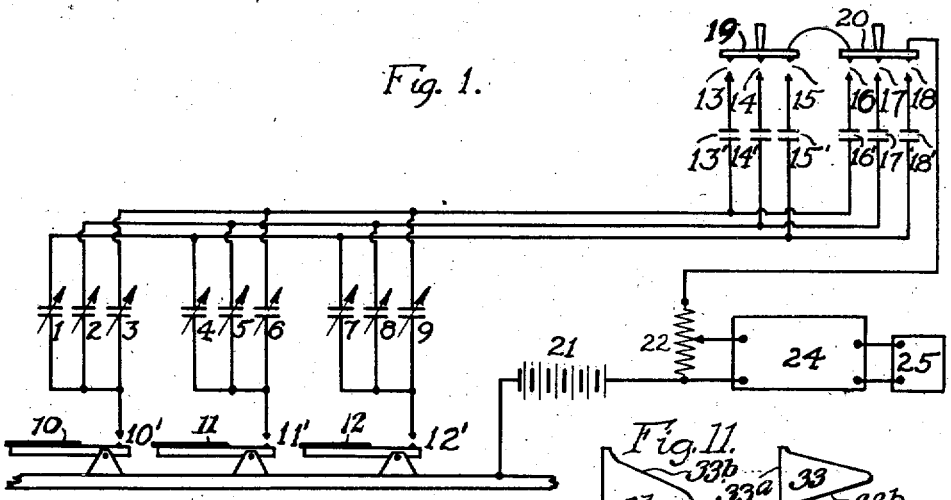
Fig. 1 illustrates, diagrammatically, one preferred simple form of the invention.

The circuit or network used in one form of the invention forming the subject of this application is illustrated in Fig. 1. Its operation will be explained by showing that it is electrically equivalent to the circuit of Fig. 3. Notwithstanding this electrical equivalence, which applies to the two diagrammatic circuits only, the invention forming the subject of this application differs from the condenser microphone and its associated circuits in several important respects. In the first place the capacitances of this invention are varied mechanically as, for example, by rotation by an electric motor instead of acoustically, as in the microphone. In the second place, if I am to have acceptable musical effects or practical control over wave-form or frequency, I must provide means for selecting certain condensers, or combinations, as wanted. This may, as has already been said, be accomplished manually, or automatically from a music roll or the like. In the third place, it is the purpose of the condenser microphone to reproduce sound, whereas the present invention produces or originates sound. The microphone sets up electric currents and voltages which are replicas of the sound waves impinging upon it, whereas the type of variation of the currents and voltages in the present invention are not replicas of sounds produced simultaneously by sound sources external to the invention.

By "waveform", I mean to refer to the curve, or function, expressing a capacitance, a current, a voltage, or the like as a function of time. By a "prescribed waveform", I mean a waveform after the above definition which has been determined upon in advance as a "pattern" or "model" for the device to follow in its operation. In accordance with the Standardization Rules of the American Institute of Electrical Engineers, the waveform, or wave shape, is independent of the frequency and of the scale to which it is plotted. See, in this connection, the Standard Handbook for Electrical Engineers, section 24, page 1818, fourth edition, third impression, published by McGraw-Hill Book Company, Inc., New York, N. Y.. By "originating" a waveform, I mean that the waveform has its inception in the apparatus, not externally in an automatically-made recording of a previously executed sound, such as a phonograph record, and not from sound waves in free space arriving from outside the apparatus as in the condenser microphone above discussed. In other words, my invention operates actively to originate the waveform, not passively to reproduce a waveform having its origin elsewhere.

In the invention as arranged for use in a musical instrument, the desired tones are probably most readily "turned on" by means of a keyboard similar to that of a piano, and the timbre controlled by means of stops like those of a pipe organ. Whereas the condenser microphone consists of a single condenser in most cases, there are in certain forms of the present instrument a number of variable condensers; in some forms there is one for each fundamental tone which I wish the instrument to be capable of producing, and one for each of the overtones.

In Fig. 1 is schematically illustrated one form which this invention might assume. It is obviously necessary to be able to control the relative intensity of the various partials of a tone, as mentioned above, if I am to select any timbre at will. Since Fig. 1 is illustrative only, it shows an instrument with three notes, three partials to each note (fundamental and two harmonics), and two stops. A schematic view including additional notes and stops will show additionally appropriate duplications of these and will make the instrument more intricate, but not more difficult to understand. Variable condensers 1, 4 and 7 respectively produce, for example, middle C, the D above, and the E above that. Condensers 2, 5 and 8 produce respectively the octave (that is, the first harmonic overtone) of middle C, the octave of the fundamental D just mentioned, and the octave of the fundamental E just mentioned. Condensers 3, 6 and 9 produce respectively the second harmonic overtone of middle C (an octave and a fifth interval above middle C), the second harmonic overtone of the fundamental D, and the second harmonic overtone of the fundamental E. A preferred mechanical form of these variable condensers will be described hereinafter.

If stop 19 be closed through contacts 13, 14 and 15, fixed condensers 13', 14' and 15' will be connected in the circuit. It will be noted that condenser 13' is connected to the second-harmonic condensers 3, 6 and 9. Hence its electrostatic capacitance determines the magnitude of current in the circuit of second-harmonic frequency. Likewise condenser 14' determines the magnitude of first-harmonic current, and 15' determines that of the fundamental current. Stop 20, if closed through contacts 16, 17 and 18, would connect fixed condensers 16', 17' and 18', which may be respectively of different capacitances from 13', 14' and 15' and may accordingly give partials having different magnitudes relative to one another. Thus a different timbre may result from closing stop 20 from that which follows the closing of 19. Obviously from Ohm's law, the alternating current impedances of each of the parts 13' to 18' must in general be materially greater than the internal impedances of the circuit meshes which they form in conjunction with any one of their associated variable condensers as a source, and part 22 as a sink, if they are to limit the current through themselves sufficiently to perform their task of determining the timbre.

It should be mentioned that condensers 13', 14', 15', 16', 17' and 18' should be slightly leaky, and condensers 1, 2, 3, 4, 5, 6, 7, 8 and 9 should be well insulated. Otherwise a maximum polarizing or exciting voltage from the battery 21 will not exist across condensers 1 to 9, and the variation in charge due to their capacitance variations will be feeble or lacking.

Numerals 10', 11', and 12' indicate the key contacts of the instrument, and determine which note (with proper tone quality or timbre as selected by closing a suitable stop) will be sounded.

As a result of the variation of the capacitances in the circuit, alternating currents flow in the resistance or other coupling element 22. The potential drops set up therein are amplified by the amplifier 24 (usually a vacuum tube amplifier) and the resultant amplifier output is made to operate the loudspeaker or telephone receiver 25.

Figure 2:
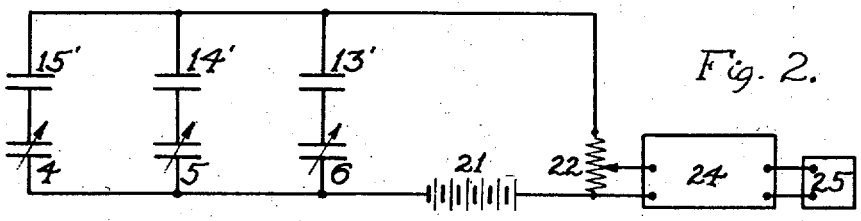
Fig. 2 represents a simplified diagram of the circuit of Fig. 1, including only those parts of Fig. 1 which are operative when certain key and stop contacts are closed and certain other contacts are open.

To further explain the operation and action of the instrument, let me assume that key 11 and stop 19 are closed. This brings into play variable condensers 4, 5 and 6, and also fixed condensers 13', 14' and 15'. Provided the stray electrostatic capacitances between other key and stop contacts and also between wires, etc., in the apparatus are negligible, condensers 1, 2, 3, 7, 8, 9, 16', 17' and 18' are not operative. Hence the part of the circuit which is used may be redrawn as shown in Fig. 2. This circuit can be further simplified to that of Fig. 3, if the observation is made that condensers 4, 5, 6, 13', 14' and 15' are electrically equivalent to a single condenser 23 (Fig. 3) whose capacitance varies in a complicated manner. If other keys or stops had been operated, I should have had to represent the operative condensers by a single condenser whose capacitance varies in a different manner. It is clear, then, that Fig. 3 does not show a circuit diagram of the musical instrument, but only a circuit electrically equivalent to the more complicated one of the instrument under certain special conditions, and its purpose is illustrative only.

In addition, Figs. 2 and 3 show one manner in which the alternating currents produced by the action of the variable condensers are made to produce sound. These alternating currents flow through coupling resistance 22, just as in Fig. 1, and produce across it potential drops having the same frequencies as have the currents. Across resistance 22 are connected the input terminals of a vacuum tube amplifier. To the output terminals of this amplifier is connected a loudspeaker or telephone receiver, whose function it is to convert the amplified electrical energy into sound waves.

One practicable means of controlling the volume of sound emitted by the loudspeaker is to make resistance 22 in the form of a potentiometer. The portion of resistance 22 which is shunted by the amplifier input terminals is variable and thus a greater or lesser fraction of the total IR drop in element 22 may be amplified and introduced to the sound translating device.

Another form of the invention is illustrated by Fig. 1 if I let symbols 13' to 18' inclusive represent fixed or manually variable resistors instead of condensers. Resistors can be made to regulate the relative magnitude of the partials of a tone, just as condensers can.

Figure 4:
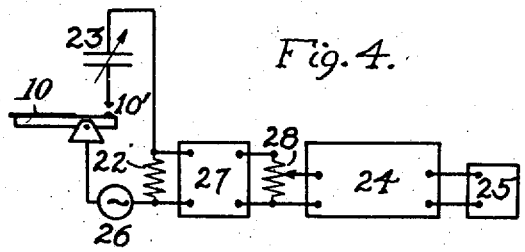
Fig. 4 shows a schematic circuit of a simple form of the invention, in which are employed a high-frequency source and a detector.

In Fig. 4 is illustrated still another form which the invention may assume: Like numbers represent the same components as they do in Fig. 1. In addition, 26 is a source of high-frequency or supersonic current. This diagram shows an instrument without stops and with but one key and one variable condenser. The method of connecting other keys and variable condensers and stops is analogous, or may be analogous, to that of Fig. 1, the chief difference between the two figures being that one uses a battery and the other a high-frequency or supersonic source. The source 26 sets up a high-frequency current (assuming that it is a high-frequency source) in the circuit consisting of resistor or other suitable coupling element, 22 and condenser 23 in series. The amplitude of this current is dependent upon the capacitance of condenser 23, and hence as the latter varies, the amplitude of the current and also the high-frequency potential drop in resistor 22 vary in synchronism with it. This modulated high-frequency potential drop is detected by detector 27 in the manner common in radio receivers. The low-frequency output of detector 27 sets up a potential drop across the potentiometer 28, which is also a volume control. This potential drop is amplified by amplifier 24 and fed to telephone receiver or loudspeaker 25.

There are other ways in which a high-frequency source can be used in conjunction with a condenser or condensers variable by mechanical means for the production of musical sounds. Fig. 4 illustrates only one such way.

Figure 5:
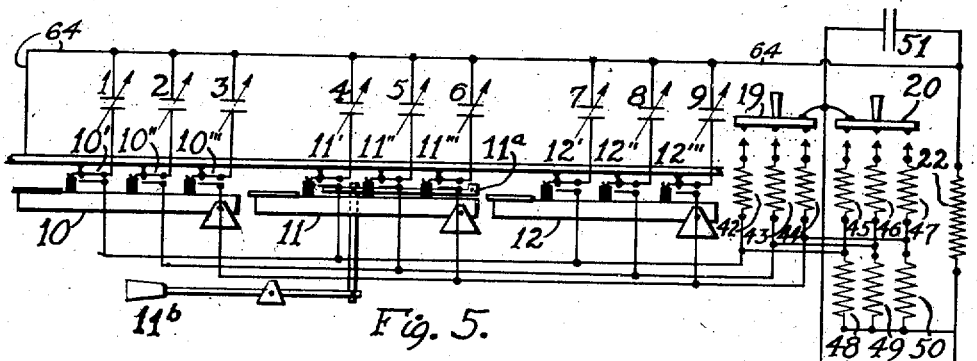
Fig. 5 illustrates schematically a part of the invention, different in certain respects from that in Fig. 1.

The relative intensities of fundamental and overtones can be controlled by controlling the amount of direct electromotive force from the battery which is applied to the various variable condensers. Fig. 5 illustrates schematically one possible circuit for accomplishing this. In this figure, most of the numerals represent the same things as in preceding figures.

In general, the resistors just mentioned are not all of the same resistance. Let me assume that key contacts 10', 10'' and 10''' are all closed by depressing the key associated with them, and that stop 19 is also closed with stop 20 open. There will be a certain difference of direct potential resident upon condensers 1, 2 and 3 as a result. That on 1 will be dependent upon the electromotive force of source 21 and also upon the relative resistances of the resistors 44 and 50. In a like manner, that on 2 will be dependent upon the relative resistances of the resistors 43 and 49, and that on 3 will be dependent upon the relative resistances of 42 and 48. It is seen that these pairs of resistors are voltage dividers whose purpose it is to select a certain part of the total electromotive force of source 21. When the capacitances of condensers 1, 2 and 3 are made to vary cyclically, the variable components of the charges on them are proportional to the direct potential differences on them, and so the relative strength of the three partials of the composite tone is under control.

Suppose now that both stops 19 and 20 are closed. By this, resistors 42 and 45 are thrown in parallel connection; likewise 43 and 46, and 44 and 47. The direct potential differences on condensers 1, 2 and 3 are now greater than before, and the strengths of the partials which they contribute to the composite tone are also greater.

The condenser at 51 is rather large in capacitance, as compared with the variable ones. It is necessary under certain conditions to insure a quasi-linear circuit with resultant freedom, or comparative freedom, from unwanted frequencies in the circuit. These frequencies can be mathematically shown to exist to an objectionable degree in the absence of condenser 51, especially when the resistance of resistor 22 is very high.

The reduction of the resistance gives what I term a "quasi-linear circuit." The increase of capacitance gives what I term a "distortionless circuit," which is a particular kind of "quasi-linear circuit."

On the keys or switches 10, 11 and 12, Fig. 5, I show upper contacts. These are desirable at times for the purpose of short-circuiting the variable condensers with which they are associated, so that these condensers cannot produce in the circuit, in cooperation with stray capacitances or leakage, alternating currents of the frequency with which they vary, at times when such frequencies are not wanted. This short-circuit is by a path including a particular upper contact, and the conductor 64 at the left-hand side of the figure.

Fig. 5 does not show the amplifier and loudspeaker, since these may be connected to resistor 22 in the same manner as in preceding figures.

I have found by experiment that in certain cases the onset of a tone, when no special means are employed to avoid this, may be unpleasantly sudden when a pair of key contacts are closed. The effect on the ear is quite similar to the striking of a bell. Although this is perhaps desirable for certain startling musical effects, it is also desirable to provide means for effecting a less abrupt onset and a less abrupt decay of the tone as well.

One such means is illustrated in Fig. 6. Instead of closing the circuit by means of a single pair of contacts like those of previous figures, a number of contacts 10' are provided, which are connected to taps on a resistor 52 as shown. As the right-hand end of the key rises, resistance is gradually cut out of the circuit, and the tone starts gradually. Also, it ceases gradually when the key is released.

An alternative method, having the advantage of freedom from a multiplicity of contacts, I show in Fig. 6ᵃ. Here, the contact 10′ closes the circuit first through high resistance 66 and the tone sounds faintly due to the alternating current voltage drop in 66. Since the lower part of this contact is mounted on a spring, the key can continue to rise while the contact remains made. As the key continues to rise, however, condenser plates 65 and 71 approach each other and form an alternating current shunt around 66. The onset and cessation of tone are gradual here also.

In Fig. 6ᵇ, I illustrate another means for securing a gradual onset and dying out of a tone of any given pitch. This particular form is sometimes desirable in order to imitate other musical instruments, such as the piano. If, in series with any key contact 10′ and the source of direct E. M. F. 21, there be connected a resistor 52, and if a condenser 53 be placed in the circuit as shown, then when contact 10′ is closed, the direct potential drop across variable condenser 1 will not rise instantaneously, but at a controllable rate, dependent upon the electrical magnitudes of elements 52 and 53. Thus an unpleasantly sharp onset of tone may be obviated or a gradual swelling in loudness may be effected, which has great musical possibilities. During the release of the key, contact 10″ is preferably made before 10′ is broken. When contact 10″ is closed and 10′ open, then, provided the sostenuto switch 55 is closed, condenser 53 discharges gradually through contact 10″, switch 55, and resistor 54. Since the rate of dying away is dependent upon the resistance of 54 and the capacitance of 53, it can be controlled by varying the resistor 54. The circuit elements 54 and 55 may be operated by a stop or pedal which also bears contacts for other switches controlling condensers similar to 53, but connected to others of the variable condensers in the instrument. When resistor 54 has a very low resistance, the tone ceases immediately upon releasing the key, just as the tone of the piano does when the sustaining pedal is not depressed. With 55 open, 53 will discharge only via leakage paths, and hence the tone may be sustained for a very long time, until the pedal is released.

As compared with the present invention, the piano has the disadvantage that its tones die away slowly, even when the keys are held down. This is, of necessity, the case in any percussion instrument unless some sostenuto device be added to it.

In Fig. 7, I illustrate a type of key and action which accomplishes what the circuit of Fig. 6 does, and more besides.

When key lever 62 is operated, the upright piece 63 on its right-hand end is raised. It strikes condenser plate 65 and raises it, together with the dash pot piston 65′, attached to it. This closes stick contact 69; the circuit through battery 21, resistor 22, and variable condenser 1 is completed, and the tone produced by the cyclic variation of condenser 1 begins to sound. It does not sound loudly, however, for the resistance of 66 to the alternating current is considerable. However, plate 65 continues to swing upward due to its inertia to a position alongside stationary condenser plate 71. Both are shown in side elevation, and the clearance between the two, when plate 65 is raised, is a few hundredths of an inch only. This condenser composed of parts 65 and 71, with air dielectric, shunts the audio frequency currents around resistor 66, and the note becomes loud. Its loudness is dependent upon the capacitance between members 65 and 71, which is in turn dependent upon how hard a blow member 65 receives from the key lever and its consequent excursion upward.

The valves 70 on the dashpot permits the condenser plate to move upward with freedom, because it is designed to open for the upward motion of the piston. As the condenser plate falls again, however, valve 70 closes. If the pedal-controlled valve 67 or the key-controlled valve 67ᵃ is closed, the plate very gradually returns to its lowest position, and just before it reaches it, contact 69 reopens. All is again in readiness for playing the same note once more. The descent of 65 is slow, unless both valves 67 and 67ᵃ are open. The rate of descent is controllable by opening valve 67 more or less widely by suitably operating pedal 68.

In Fig. 8, I illustrate another type of mechanism which accomplishes the same thing as that of Fig. 7, but has certain advantages over it. All similarly-numbered components are like those of Fig. 7, and perform identical functions. Instead of a dashpot, however, this device utilizes a rotating shaft 74. The speed at which pulley 72, with its ratchet 73ᵃ, is rotated by prime mover 32 is dependent upon the tightness of the belt 75 between them, which is under the control of foot pedal 68. When the pedal is not pressed, the idler pulley 72ᵃ keeps the belt taut, and pulley 72 rotates with its maximum speed. When the key lever 62 rises it strokes condenser plate 65 and causes it to rise to a height dependent upon the force of the blow which it imparts to it, just as in Fig. 7. In addition, it raises stop 73ᵇ into contact with ratchet wheel 73ᵃ. The friction between parts 73ᵃ and 73ᵇ is greater than that between 73ᵃ and the shaft with which it has just been rotating. Its rotation is stopped, then, as long as the key is depressed, even though the shaft may go on rotating.

When condenser plate 65 has risen to the top of its arc of motion, the pawl 73 which it carries engages ratchet wheel 73ᵃ, and it remains in that position until the key is again released, ratchet wheel 73ᵃ resumes its rotation, and plate 65 falls, as fast as the rapid rotation of the shaft will permit. The capacitance between 65 and 71 becomes less and less during the fall, decreasing the volume of the tone rapidly but not instantaneously, and finally contact 69 breaks when plate 65 has come again to nearly its lowest position.

If the shaft with which ratchet 73ᵃ rotates is made to rotate slowly or to stop altogether, by reason of pedal 68 being depressed, the tone will be prolonged after key lever 62 has been released. The length of time the tone is prolonged depends upon the rate of rotation of the shaft, which can be controlled through wide limits by depressing pedal 68 to varying distances. When the pedal 68 is released, the shaft and ratchet resume their rapid rotation almost immediately, thus permitting 65 to fall and contact 69 to break.

It is evident that pedal 68 performs for the present invention just what the loud pedal does for the piano. It serves to maintain or prolong the tone after the key has been released, for a shorter or longer interval. In the present case, the pedal can prolong the tone indefinitely, whereas in the piano, the tone can persist only during the intervals when the strings are able to continue their vibration. However, it is unnecessary to prolong the tone indefinitely if one chooses not to, for condenser plate 65 may be made to return at any desired rate to its position of rest, according to how far pedal 68 is depressed. If the direction of rotation of the ratchets be reversed, a tone may be made to increase in volume after having been sounded, thus producing a dynamic effect new to the art of music, and of great value to the composer and performer.

It is to be understood that an instrument having a plurality of keys like 62 will also have a plurality of condenser plates, contacts like 69, and ratchet mechanisms like 73. There will be one common shaft for the entire keyboard; one pulley like 72, and also one idler pulley like 72a.

It has been found by experiment that even trained musicians cannot distinguish between the tones of certain musical instruments in case they cannot hear the onset or end of the tone. It is seen, therefore, that the onset and ending are characteristic of an instrument, and means for varying these, particularly the former, are desirable if a wide variety of musical effects, both imitative and new, are to be attained. It has been further discovered that, if the higher harmonics of a tone attain their full amplitude appreciably before the fundamental and lower harmonics, the effect is that of an "explosive" onset; on the other hand, if the higher harmonics are later than the lower ones, the onset is apparently a smooth and gradual one.

A convenient way of accomplishing this is to mount the lower contacts of switches 10', 11', 12', Fig. 5, on a table or tables 11a, which can be slightly tilted by means of a stop 11b. Since this is, practically speaking, a part of the switch, it has been given the same number 11, as has the switch in Fig. 5. No tables or stops are shown at switches 10' and 12', since these might be identical with the table and stop 11a and 11b, and in any case they would be of similar construction. If stop 11b is raised, the lower contact of switch 11' will be made first when key 11 is pressed, other contacts will follow sequentially, and contact 11''' will be made last. Assuming that the variable condenser 4 is producing the fundamental tone and 6 the second harmonic, the onset of tone would be a comparatively gradual one. On the other hand, if stop 11b were pressed down, the part 11''' would first make contact, and the onset would be more sudden.

In Fig. 9, I illustrate another type of volume control which I have found valuable. 56 represents the plate of one of the vacuum tubes of an audio amplifier. 57 represents the grid of the next succeeding tube. 58 is an audio-frequency transformer. The primary and secondary windings of the transformer are connected respectively to the plate and grid, 56 and 57. The other terminals of the transformer may return to the plate voltage supply and to the grid bias supply in any one of several different manners, as is well known to those skilled in the application of vacuum tubes for amplifying purposes.

Across the primary winding of transformer 58, as shown, is shunted a branch circuit consisting of a resistance 59, inductance 60 and condenser 61 in series. The values of resistance, capacitance, and inductance are so chosen that the branch circuit resonates at about 3,000 cycles. Resistance 59 is variable and its manipulation regulates the volume of tone from the telephone receiver or other sound emitter connected to the amplifier output. Such a volume control as this has the property that it decreases the volume of tones in the neighborhood of 3,000 cycles more rapidly, as the resistance of coil 59 is decreased, than it decreases the volume of tones of substantially lower or higher frequency. The advantage of this is explained below. The frequency selective volume control shown in Fig. 9 may be used either with or without other means of volume control.

It is evident that such a volume control would work in the same manner if connected similarly to an amplifier having resistance or other type of coupling between successive amplifying audions. Or it might be connected elsewhere in the circuit than in the amplifier as, for example, in shunt to the loudspeaker. It is to be understood that my invention comprises all such locations for the control and that it may be used either with or without other means of volume control, its connection to the interstage transformer being illustrative only. Its essential features are that it is a shunt consisting of resistance, inductance and capacitance in series, that it is placed somewhere in the circuit between the source of alternating E. M. F. and the translating device or other output mechanism, and that it attenuates certain tones more markedly relative to others for low volumes of output than it does for high volumes, said tones discriminated against at the low volumes being in that range whereto the human ear is most sensitive.

On page 230, in Fig. 109 of "Speech and Hearing", by Harvey Fletcher, 1929 edition, there is illustrated a chart showing the contour lines of equal loudness, as judged by ear, for pure tones. The meaning of the chart is explained in the context. These contour lines show that the average human ear has a maximum sensitivity for sounds in the neighborhood of 3,000 cycles, and that as the energy content of a pure tone decreases the apparent loudness also decreases. However, it is evident from the greater curvature of the lower graphs in the chart that the apparent loudness decreases less rapidly for tones of about 3,000 cycles than for tones of lower or higher frequencies.

The type of volume control illustrated in Fig. 9 is capable, if properly constructed, of quite satisfactorily compensating for this fact, inasmuch as it cuts down the intensity of the 3,000 cycle output of the amplifier more rapidly than that of other frequencies. Thus the important result follows, that the apparent loudness of all pitches of tone remains about constant, whether the instrument is emitting a loud or soft tone.

There is the added fact that low-pitched tones mask those of higher pitch, and that this masking effect is more serious at high volume than at low volume. This also is discussed in the text above mentioned. This masking effect is another reason for the desirability of the above-described frequency-selective volume control.

It would not be out of place here to include a word regarding what I consider to be the most desirable form of curve relating the fundamental pitch of a tone emitted, and the apparent loudness, to the average human ear, of that tone. It would appear that all tones, whatever their pitch, should produce to the ear substantially the same loudness. An instrument designed according to this assumption should be free from objectionable masking of certain tones by other tones, and should moreover exhibit a pleasing balance between bass and treble. In the parlance of organ-builders, such an instrument would be properly "voiced." Of course this definition of proper voicing applies only to tones under the control of a given keyboard. If there is more than one keyboard, it may be desirable to play the tones on one of these at a higher volume than the tones of another, so that, for example, the melody can be made to stand out.

It is not always the case that a given amplifier and loudspeaker give tones of uniform apparent loudness, irrespective of pitch, for a given electromotive force applied to the input terminals of the amplifier. For this reason, it may be desirable to so design the amplifier or speaker so that this loudness is apparently uniform. Another means for accomplishing the same end is to so design that portion of the device which produces the alternating E. M. F. applied to the amplifier that the apparent loudness is independent of pitch of fundamental tone. One way in which this may be accomplished is to regulate the dimensions of the several variable condensers in the input circuit of Fig. 1. It is obvious that, the smaller the change in capacitance as a function of time, the less will be the alternating electromotive force which it produces. Another method is to increase the minimum and maximum values of capacitance of a given condenser, maintaining the difference between these two values constant. I am referring, of course, to the minimum and maximum values which are assumed by the capacitance of the variable condenser as it varies periodically. It can be shown that, under proper conditions, this will serve to decrease the alternating electromotive force. Still other methods are the insertion of alternating current impedance in series with the variable condenser, so that there will be an A. C. drop or loss of E. M. F. therein, and the lowering of the direct or high-frequency voltage impressed across the condenser in question. In the latter case, the alternating electromotive force which the condenser is able to impress on the amplifier input terminals is lowered in the same proportion as the supply voltage is lowered, and becomes zero when this voltage is zero.

While the foregoing discussion has been chiefly confined to the use of the invention as a musical instrument or a part of one, it has been shown that, in order to produce musical tones, it is first necessary to produce alternating electric currents of controllable audio frequency and waveform. Obviously, alternating currents, either with or without amplification, can be used for purposes other than the production of musical tones. The use of alternating currents of controllable frequency and waveform in electrical laboratories is one such other purpose. It has been considered unnecessary to show special diagrams of the invention in uses other than the production of musical tones, since these diagrams might be identical with those already exhibited. In general, an alternating current source for other purposes than the production of musical tones would be simpler than the musical instrument, for quite frequently the device need produce but one frequency at a time rather than a plurality, as is the case in most musical instruments constructed after this invention. Moreover, oftener than not, the provision of special means for regulating the type of onset and dying away of a current will be unnecessary for other than musical purposes. These differences in detail (though not in principle) will be apparent to skilled electrical research workers. It will suffice to point out that, in one form of the invention as applied to these other uses, numerals 10 to 18 in Fig. 1 would represent switch contacts instead of key contacts and stop contacts.

Reference has been made in the foregoing to variable condensers which generate the alternating voltages and currents as desired. These have been indicated to be of such form that each by itself generates a sinusoidal component of electromotive force or current. In this case, each condenser would be of such construction that its capacitance varies substantially according to a sinusoidal law. The functions of several condensers can, under certain conditions in practice, be economically combined into one condenser. In such case, the capacitance of a single condenser would vary cyclically, it is true, but not necessarily according to a simple sine law. My invention has application also to such more complicated laws of variation of capacitance. If condensers which are like that of Figure 11$^b$, to be explained later, and which have irregular non-sinusoidal edges, are used in the circuit of Figure 1 or Figure 5, the result will of course be that non-sinusoidal currents will be combined in the circuit by the selectors. All condensers of a group, as 1, 2, and 3, may produce the same fundamental frequency but each may produce a different waveform.

Many variants are possible in the construction and electrical connections to the plurality of variable condensers. Without limiting my invention thereto, I illustrate in Figs. 10 and 10$^a$ a preferred mechanical form and arrangement of parts. Only a portion of the entire device is shown, since other parts will be for the purpose of producing other overtones and fundamental tones of other pitches. There is no real need of showing the various parts in extreme detail and in their entirety, and to exact scale. The details may differ through rather wide limits without rendering the device inoperative or altering the principle of its operation.

I illustrate a set of three cylindrical rotating members 29, which I term sprockets. In more complicated forms of the invention, there may be thirty or more of these. All are mounted on the same shaft. Each sprocket drives a continuous metallic band 30. To avoid slipping of the band, each sprocket has small teeth arranged at equal intervals around its periphery, and each band has correspondingly spaced small holes 30', which engage the teeth of the sprocket. The method of driving the bands is similar to that of driving the photographic film in a motion picture projector.

Each band carries on that one of its two surfaces which does not contact with its sprocket, a number of uniformly spaced metallic projections 31, which I term scanning electrodes. These extend across the bands and project slightly above their surfaces. Each band travels for a certain distance beneath a stationary insulating member 34. It is to be noted that the solid insulating material is so disposed that it is substantially free from shifting electrostatic flux. The band is constrained to travel in a definite path, without whipping, weaving, etc. Attached to the insulating member 34 there are a number of plane metallic plates or electrodes 33, which are accordingly insulated from one another. These I term stator plates. Insulating plate 34 is represented as broken away, so as to reveal more of the bands 30 with their electrodes. The stator-plates have each one straight edge 33$^a$ and one edge 33$^b$ whose form is a chosen curve or wave. Two different forms of such stator plates are shown in Figs. 11 and 11$^a$. It is to be understood that other plates, shaped according to other patterns, may be used; each is formed so as to produce a different frequency of variation of capacitance. The plates appear edgewise in Fig. 10ᵃ, and their curved edges are shaded in the drawings.

The capacitance is made to vary as follows. As one of the electrodes moves along under the stator plates, it travels at a uniform rate of speed at a fixed distance from them, perhaps one one-hundredth of an inch, but does not touch them. The width or dimension of an electrode, measured in the direction of the length of the band, is never greater than one-half of one cycle of the curve cut into the edge of any of the stator plates which it passes. It is thus apparent that the electrostatic capacitance between the electrode and a given stator plate varies as the former passes along near the latter. For example, when the center line of the electrode is opposite the widest part of a stator plate like that in Fig. 11, there is a maximum capacitance between the two; when opposite the narrowest part, there is a minimum of capacitance. If one edge of the stator plate is in the form of a sinusoidal curve and the other edge is straight, and the distance between electrode and plate remains constant as the former moves along at a uniform rate of speed, then the capacitance varies with time in a simple harmonic fashion. The length of each plate, and the spacing of electrodes is such that, just as one electrode is leaving the plate at one end, the next is approaching it at the other; in other words, the electrodes are spaced on centers whose distance apart is equal to the length of a plate. Each electrode then, as it passes a given stator, causes as many complete cycles of variation of capacitance as there are complete cycles in the edge of the stator, and when one electrode has caused that many cycles of change of capacitance, the next has arrived, just in time to generate that same number of cycles again, without any interruption or irregularity in the continuous cyclic variation of capacitance, except as mentioned below where the necessity for one abnormal space between electrodes on each band is mentioned as frequently unavoidable. The electrode, in passing a plate like that shown in Fig. 11, will generate one complete sinusoidal wave of capacitance variation; in passing a plate like that in Fig. 11ᵃ, it will generate two complete cycles of double the frequency generated with the plate shown in Fig. 11.

I have found that, by using twenty-four bands, 523 different frequencies can be generated, which represent all fundamental tones of the chromatic scale, together with the first fifteen harmonics of each, from C of 32 cycles (scientific pitch) to C of 8192 cycles, except that harmonic frequencies above 8550 cycles are omitted as unnecessary to the production of successful musical effects. The entire system of sprockets, bands, and stator plates may be housed in a box roughly one foot by five feet in dimensions.

In order that the condenser capacitances may be continuously varied, the sprockets are all mounted on and rotated by a single shaft, and driven, or actuated, by a single electric motor or other prime mover 32. The speed of this motor may be regulated to the requisite degree of accuracy by a governor 35, which may be of any suitable type. Suitable governors have already been invented by others, and it is not my purpose to apply for a patent on any prime mover or speed governor, but only to seek to patent their application to the invention described in this specification and claimed as novel in the appended claims.

This invention has application to any musical scale or system of temperament. However, in order to produce all of the tones of an even-tempered musical scale, it is necessary that the diameters of the several sprockets should in general bear irrational ratios to one another. In such a case, it can be shown that there will necessarily be at least one space between adjacent electrodes on most of the belts or bands, which is abnormally long or short. This will cause one break in the continuous cyclic variation of capacitances as mentioned above. It has been found, however, that this one break is so slight in its effect that it makes no impression on the hearer, who still gets the impression of a continuous pure tone. If it were desirable for any reason to avoid this interruption, it might be done by omitting the sprocket teeth and holes in the bands, simply using pulleys.

A given band, and each of the stator plates with which it is associated, constitute the two electrodes of one of the condensers 1 to 9 in Fig. 5. Connection to the bands is conveniently made through the sprockets, which may be of metal. The actual schematic circuit for this mechanical arrangement would then necessarily be slightly different from that of Fig. 1, since one terminal of each condenser, namely the band, would be connected to all similar electrodes (bands) on all of the other condensers. This rules out the circuit of Fig. 1, if the mechanical arrangement of Figs. 10 and 10ᵃ be employed. If this mechanical arrangement is to be used in cooperation with the circuit of Figure 1, each group of condensers 1 to 3, 4 to 6, and 7 to 9 of Figure 1 is on a separate belt, as 30, in Figures 10 and 10ᵃ. The pulleys 29 are constructed with a metallic rim and insulating web, and the connections to 10′, 11′, and 12′ are through a brush riding against each rim. This arrangement is not shown in Figures 10 and 10ᵃ, because alternative arrangements may not be shown on a single figure, and because the addition of a drawing is considered superfluous; in the light of the figures and the written description foregoing, the construction will be obvious to one skilled in the art. The plates 33 are the upper plates of 1–9 in Figure 1, and are connected according to the diagram there shown.

Periodic alterations in volume, sometimes called "tremolo", are readily effected by periodically short-circuiting a portion of volume control 28, in Fig. 4. This may be done automatically by rotary switch 41, Fig. 10, which is on the same shaft as the sprockets, and has a periphery formed partly of insulating material and partly of conducting material. Against element 41, brush 40 bears to make contact at regular intervals with the periphery. This brush may be simply a phosphor bronze strip. The metallic portion of the switch 41 makes connection to volume control 28, Fig. 4, through the shaft on which it is mounted, and the bearings of the shaft. The brush may be directly connected to another point on control 28, so that when the brush and rotating portion make electrical contact, that portion of the volume control which lies between the two points of connection just mentioned, is shorted out. This shunting circuit branch for tremolo purposes may be similarly connected across a portion of coupling element 22 in any of the figures.

In Figs. 10 and 10ᵃ, I show means for causing a slight periodic fluctuation of pitch in all of the tones produced by the instrument. Such a fluctuation is sometimes called "vibrato". By means of foot-pedal 39, idler wheel 38 may be raised so as to tighten belt 36. The mass 37 is thus set into to-and-fro motion from the pulley on the shaft of the motor or prime mover 34, through the intermediary of a crank motion. The mass 37 thus periodically absorbs energy from the shaft of the prime mover and causes it to fluctuate in its rotational velocity.

In Fig. 10, belt 36, if tightened, rotates crank shaft 37[a], thus imparting an oscillatory motion to mass 37 through the intermediary of connecting rod 37[b]. The mass 37 is constrained to oscillate to and fro in a straight-line path by the guiding influence of bearing 37[c].

In the foregoing specification I have assumed a single keyboard and set of stops. In more complicated forms of the invention, a plurality of manual or pedal keyboards and sets of stops could be provided, either all within the reach and control of a single musician, or of several. This would make possible, for instance, the simultaneous playing of one part of a composition, perhaps the melody, on one keyboard and with a given tonal quality, and another part, as the accompaniment, in a contrasting tonal quality and on another keyboard. The manner of doing this would be quite similar to the manner in which it is now done on a pipe organ. It is possible, by means of electric circuit arrangements which I have devised, but which are not described in this specification, to accomplish this using only a single set of bands and stator plates, like the set described above. Various coupling systems, by means of which the tones normally controlled by one keyboard are temporarily made subject to the control of another, or by means of which the depressing of one key is made to simultaneously sound those normally under the control of other keys on the same keyboard, are possible with this invention, just as in the case of the pipe organ. The manner of accomplishing this will be apparent to one skilled in the art of organ building.

I have found that the principle of voltage production by variation of capacitance can be applied in a somewhat different manner than that set forth above, and that this modification, and the apparatus for its accomplishment, are particularly useful in non-musical applications. This apparatus I illustrate in Fig. 11[b]. In this figure, numeral 201 represents a rotating metallic wheel, whose outer surface is a portion of a cylinder. One edge of this surface is bounded by a plane, but the other may be irregular, and of any desired wavy contour. Connection is made to 201 by means of any suitable brush 205 bearing on the rotating member. In order to continuously vary the capacitance of the condenser, the wheel may be rotated unidirectionally by any convenient actuating means, such as shown in Figure 10.

Adjacent to the periphery of the wheel is a stationary scanning instrumentality, in this case a metallic electrode 202. It is turned edgewise to the wheel, as shown. Measured in the direction of the axis of the wheel, the electrode is somewhat longer than the width of the wheel, measured axially; that is, the scanning instrumentality is extended beyond the wavy edge of the wheel. Due, therefore, to the irregular edge on the wheel, the capacitance between wheel and electrode varies as the wheel rotates. In series with the capacitance are connected a source of direct E. M. F. 21, and a resistor 22. If the values of resistance and capacitance in the circuit are properly chosen, the current in the circuit, and hence the potential drop across 22 will be the same function of time as the capacitance between 201 and 202. It is only necessary, then, to cut on the periphery of the wheel any prescribed wave such as I wish to produce in electrical form, connect the circuit as illustrated, and rotate the wheel at the proper speed. As an aid to obtaining this exact correspondence between the wave on the wheel and the wave of current or voltage, it is frequently advantageous to shunt a condenser 51 across the variable one. A circuit fullfilling this requirement of exact correspondence I term a "distortionless circuit". It is by no means a foregone conclusion that any input circuit whatever will be distortionless in this sense.

The condensers 1 to 9 in Figure 5 are all in parallel with condenser 51 and with one another, insofar as varying currents are concerned. Likewise in Figure 11[b], the wheel condenser 201, 202, is in parallel with fixed condenser 51. In either case, the several parallel condensers may be regarded as having a constant component of capacitance $C_0$ in parallel with a variable component $C_1$, the latter being such that its average value over a long period of time approaches zero as the period of time approaches infinity. For the exact correspondence mentioned above, that is, for a distortionless circuit, the following conditions must be satisfied: (*a*) $C_1$ must be small at every instant of time compared with $C_0$, and (*b*) the reactance of $C_0$ must be small compared with the resistance of 22 for all frequencies within the essential range.

By essential range I mean the following. The varying capacitance $C_1$ is a function of time which, however irregularily it varies, can theoretically be analyzed by Fourier Series or Fourier Integral methods into the sum (or integral) of a large number of periodic functions of time. For an accurate representation of $C_1$, certain of these functions are essential, and certain of them contribute little to the accuracy. In the term "essential range" I mean to comprehend all those frequencies essential to represent $C_1$ to a given degree of accuracy.

If, in Figures 5 and 11[b], part 22 represents an unvarying impedance, small compared with the reactance of $C_0$ at all frequencies in the essential range, or if $C_1$ is at all times small compared with $C_0$, or if both conditions obtain, then the varying currents in the circuit will be substantially those which would flow in what I term the "equivalent linear circuit"; viz., in a circuit consisting of impedance 22, a capacitance $C_0$, and a source of E. M. F., *e*, in series where $$e=\frac{E'C_1}{C_0}$$

and where E′ is the difference of potential which would exist across the varying condenser if, for the moment, its capacitance were held constant at a value $C_0$. Since E′ and $C_0$ do not vary with time, and since $C_1$ does vary, *e* varies in strict correspondence with $C_1$. This E. M. F., *e*, then, may be regarded as acting to produce a flow of varying current having the same component frequencies as has $C_1$. Since the circuit does not have zero reactance, in general, for every one of the component E. M. F.'s which caused them, the current is not in general an exact copy of the capacitance variation; that is, the circuit is not a distortionless one. It is only in the case, as above stated, when 22 is a pure resistance, large compared with the reactance of $C_0$, that distortionless operation occurs. If one of the two conditions stated in the first sentence of this paragraph obtains in a circuit, that circuit is what I term "quast-linear", because it can be solved in terms of an equivalent linear circuit having fixed impedances. In other words, functionally defined, a quasi-linear circuit, or network, is one wherein the elements are so constructed and of such relative electrical magnitudes that the relationship of the output current or voltage of said circuit to the variable component of capacitance, or of the reciprocal of said capacitance, is expressible with substantial accuracy by means of a linear differential equation having constant coefficients, the derivatives of the equation being expressed with respect to time.

Figure 11B:
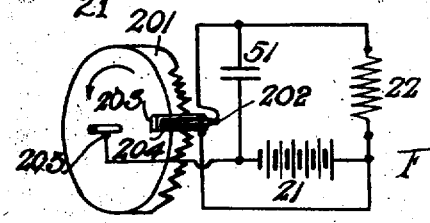

To make the circuit of Figure 1 quasi-linear, some benefit as regards suppressing musically objectionable harmonics may be had by shunting a condenser across resistor 22 in the manner of condenser 51 across 22 in Figure 5 and Figure 11b. However, a condenser in such a location in Figure 1 is not as effective as in the two above mentioned figures, due to the presence of condensers or resistances 13' to 18' which decouple it materially from condensers 1 to 9. It is preferable to increase the fixed component, $C_0$, of capacitance of each of condensers 1 to 9 individually relative to the variable component, $C_1$, of each, and so to render the input network quasi-linear with respect to each acting individually.

The high-frequency input circuit 10, 22, 23, 26 of Figure 4 may also be quasi-linear. The condition for quasi-linearity here is that the change in the impedance of 23, at any of the frequencies in the essential range, be small compared with the total impedance of the circuit. The solution may be accomplished in terms of an equivalent linear circuit by known methods.

The reason why a quasi-linear circuit is desirable for most applications of my invention is that, if the circuit is definitely non-linear due to 22 being too great or $C_1$ being too great relative to $C_0$, then frequencies will appear in the E. M. F. across 22 which were not present in the capacitance variation, a result which is usually objectionable, especially in musical applications. Referring to Figure 11b for illustration, if it should prove that a circuit like that shown was not sufficiently linear, one would have three recourses; (a) reduce the impedance 22 external to the two condensers, or (b) increase the fixed shunt capacitance 51, or (c) reduce the magnitude of the capacitance variations in 201, 202. Any of these measures will in general also reduce the varying voltage passed on to the amplifier or other work circuit. In the interest of linearity, it is generally advisable to avoid approximating a resonance condition in the circuit for an audio frequency in the band to be used, since such resonance will tend to stress the harmonic having approximately its resonant frequency.

In the circuit of Figure 4, using a high-frequency source it is also sometimes advisable to avoid marked resonance at any frequency in the neighborhood of that of the source, for such a circuit is critical, and moreover the curve relating capacitance and high-frequency admittance is sharply curved in the neighborhool of resonance, as is well known. This curvature has the power to cause non-linear distortion. The more nearly linear the curve relating capacitance and root-mean-square high-frequency current, the less the distortion. It is to be understood that the "distortionless circuit" is a particular case of the "quasi-linear circuit".

If I wish to reproduce in electrical form small waves on the wheel which are comparable in tangential dimension with the thickness of the stationary electrode (this thickness also to be measured in a tangential direction) it may be desirable to place around electrode 202 a shield or guard 203. This shield is insulated from electrode 202 by means of air spacing or of the insulating solid material 204. It is to be noted that the insulating material 204 is so disposed that it is substantially free from shifting electrostatic flux, the flux in 204 having been virtually fixed by the guard. The shield is connected to one or the other end of the battery 21, as shown, and hence serves to confine the electrostatic field quite closely to the adjacent faces of wheel and electrode. The principle is quite like that of the "guard-ring" used in certain laboratory measurements of electrostatic capacitance of cables, and the like. This principle is here illustrated in connection with the irregularly shaped wheel. It is to be understood, however, that it has application to means as herein described for producing sinusoidal or other periodic waves such as the means illustrated in Fig. 10. Its mode of application to these will be apparent by analogy with its use in Figure 11b.

The varying voltage produced by this device can be used in a variety of ways which will be apparent to one skilled in the art. It may, for example, be applied to an amplifier as are the alternating voltages in the foregoing figures.

Rather than being cut into the periphery of a wheel, the irregular edge which causes alterations in capacitance may in certain forms of the device be cut into a belt or tape of metal. This tape may be endless, or not, according to the use to which it is to be put. It is evident that the wave of voltage or current produced need not be periodic, for a given point on the wheel, tape, or belt need pass the electrode only once. In this form, then, the invention is not necessarily a means of producing periodic or alternating currents and voltages, but may produce currents and voltages varying in a very complex manner indeed. Nevertheless, it will not be difficult to determine how to cut the irregular edge to arrive at a given desired law of current and voltage variation, for there may be exact correspondence between the shape of the edge and the shape of electrical change resultant.

Another actuating means for continuously varying the capacitance of the condensers which has the advantage of great simplicity is described below. One electrode of each condenser may be a fixed metallic plate, and the other a strongly resonant vibratile member, such as a reed or a tuning fork, or a bell, or a bar, or a tube, all common in musical applications. If this latter member be given impulses by electrical or mechanical means, at intervals which are not too great, it will be kept in continuous vibration at its own natural frequency or frequencies. Its amplitude will, of course, die out slightly between impulses, but with proper arrangements, its motion may be regarded for all practical purposes as periodic. The amplitude of capacitance variation may be adjusted within limits by altering the distance between movable and fixed plates, the areas of the two adjacent to each other, and the magnitude of the impulses received by the vibratile member, while the alternating voltages which they produce may be varied, for timbre-control purposes, by proper selection of the direct exciting E. M. F.'s, and by means of series impedances, as above described.

The above paragraph describes vibratile means for originating complex waveforms directly, without resort to electrical synthesis of tonal partials. In such devices in their simplest form, the electrodes are not shaped in accordance with the waveform, and the variations of capacity occur by virtue of variations, in response to vibration, of the effective thickness of the airgap intervening between the electrodes. In a variant of the vibratile type of condenser, described below, one or more of the electrodes is shaped in accordance with the prescribed waveform, and the waveform may be substantially sinusoidal, as will appear. The electrode shapes may be arrived at empirically or, in the construction of Fig. 12, they may be calculated, provided the relative electrode displacement is substantially sinusoidal, and the airgap remains substantially constant, as will be evident to one skilled in the art. The construction to be described will be such that each condenser, by itself, will originate a substantially sinusoidal waveform of capacitance. It will be also evident that such a vibratile condenser can be used for each of the condensers diagrammatically illustrated at 1 to 9 of Figs. 1 and 5. In such a case, each such condenser will originate an individual tonal partial. Preferably, each vibratile member will describe an approximately simply harmonic motion, and there will be one for each partial tone of each pitch which it is intended to produce.

Parts 80 to 83, inclusive, of Figure 12 constitute a condenser as illustrated diagrammatically at 1 in Figure 6$^b$. Parts 80 and 81 constitute a free reed, similar to that in the reed organ, and arranged to be vibrated pneumatically, as in the reed organ. Part 80 is the frame of the reed, and 81 is a strongly resonant vibratile tongue. The end of the tongue 81 may be bent to form the electrode 82, or 82 may be a separate piece associated with the tongue 81 by means of solder, rivets, or any suitable linkage whereby the vibrations of the tongue are communicated to the movable part 82. Part 83 is a fixed electrode distinct from 82, suitably insulated therefrom, and separated from it by a thin airgap. Figure 12 shows the two electrodes, 82 and 83, as being substantially coaxial cylindrical segments, the axis of the cylinders being near the line of attachment of parts 80 and 81, so that the electrode 82, for all practical purposes, oscillates about this line. Under these conditions, the two electrodes remain at a substantially fixed distance from each other during vibration, and the thickness of the airgap remains fixed for all practical purposes. It is evident that, during vibration, the effective area of the two is a linear function of their displacement relative to each other under these conditions. Likewise, the capacitance between them, being directly proportional to their effective area, is a linear function of this displacement. Hence the capacitance is a substantially sinusoidal function of time, being necessarily a "copy" of the intended substantially sinusoidal partial waveform, under the construction herein illustrated and described.

Attached to the part 82 and insulated therefrom by the insulation 84 is the guard electrode 85. The guard electrode 85 is connected through the wire 86 to one terminal of the source 21. Attached to the fixed electrode 83 and insulated therefrom by the insulation 87 is the guard electrode 88. The guard electrode 88 is connected by the wire 89 to one terminal of the source 21. Parts 24 and 25 of Figure 12 are respectively an amplifier and a sound translating device. The remaining reference numerals of Figure 12 designate the same circuit elements as do those of Figure 6$^b$, and these elements operate in the same manner.

The vibratile members may be set in vibration by mechanical means such as single or repeated strokes with hammers or bowing as in the violin. Or by means of magnetic impulses, in which case the members would have to be ferromagnetic material or else carry an electric current, in a magnetic field so that the necessary electromagnetic reactions could be brought to bear on them or else be attached to such elements. An inexpensive and simple means of impulsing them is to fix, adjacent to the vibratile members, stationary electrodes in addition to those mentioned above. A periodic potential difference applied between these and the vibratile members will set up electrostatic forces sufficient to set them into vibration, damped or undamped.

Condensers 1 to 9 and others whose capacitances are caused to vary by mechanical means, may have a fixed element, plate or electrode and a movable element, plate or electrode caused to move relative to the fixed member by a movement of translation, reciprocation or rotation, through the agency of a motor or any other actuating means.

Since the capacitance of a condenser may be varied by altering the distance between its electrodes as well as by varying their dimensions, the working surfaces of the electrodes need not be portions of planes or of cylinders, but may be so formed or configured that as they move in relation to each other, their active portions approach or recede from each other. They might therefore be corrugated in form, for instance. The capacitance of a condenser is also a function of the dielectric between its electrodes. Hence the dielectric may be of variable width or thickness or dielectric constant from point to point, and it may move relative to one or both of its associated electrodes. All of these variants are comprehended within the scope of my invention.

The shapes of parts, especially airgaps, dielectric, and electrodes in the condensers of my Figures 10 and 11$^b$ are naturally very important, because variations therein will alter the waveform originated by any condenser of such construction. Such parts must thus be specially and appropriately shaped for the particular waveform prescribed, as is taught elsewhere herein. Such shaping may be arrived at by empirical methods, or by precalculation, or by a combination of these methods, as seems most appropriate, without departing from the spirit of my invention. None of the claims is limited to any particular method of arriving at the requisite shapes. However, certain of them do specify shaped parts.

The foregoing description of the wheel-type condenser of Figure 11$^b$ illustrates the possibility of precalculating the law of capacitance variation as a function of time, provided:

(*a*) The fringe flux is small compared with the main flux, which extends straight across from electrode to electrode, (b) All solid dielectric material and insulation is free from shifting flux within it, (c) The width of electrode 202 is narrower than a half of the length of the shortest wavelength in the wavy edge of 201, and preferably very much narrower than this, (d) The angular displacement of 201 for each instant of time is known.

These conditions being satisfied, the condenser capacitance can be calculated by the well-known formula for a parallel plate condenser. This formula shows that the capacitance is directly proportional to the product of the area of the dielectric, the dielectric constant, and the reciprocal of the separation between plates. If the plates or the lines of force are not strictly parallel, or if the dielectric is non-homogeneous (as when it is composed partly of air and partly of a solid), some correction must be made. That is, an effective area, an effective dielectric constant, or an effective separation should be used in the formula. Only in an ideal case are effective and actual values equal. The same principles of calculation apply, regardless of which of these three effective quantities is or are varied. Regardless of whether the effective value of one of these quantities is or is not exactly equal to the actual value, it may still be considered that such an effective value can be arrived at either by calculation or by experiment, and that its use in the formula will give the correct value for capacitance.

In all condensers embraced by my invention, there is an actuating means, such as the wheel of Figure 11b, or the belt of Figure 10, to which a part of the condenser is attached, and by which that part is made to move, with resultant variation of one of the three effective quantities mentioned above, or else the means and part are identical. There is a cause-result relationship between the displacement of an actuating part and each of the variable quantities. This relationship is expressible by a differential equation, as is well known. If this equation is other than a linear one with constant coefficients, the effective quantity is said to be a non-linear function of the displacement of the actuating means, and conversely, a linear equation with constant coefficients bespeaks a linear function of the displacement.

In the interest of easy design of a condenser like those of Figures 10 and 11b, it is very advantageous to make the effective width (dimension in the direction of relative plate motion) narrow compared with a half wavelength on the wavy edge, for in such case the edge need merely have the shape of the desired function which the waveform of capacitance is to follow. To this end, it is often necessary to control the fringing by shield or guard electrodes as above contemplated. If the circuit of the condenser is a distortionless one, as described elsewhere herein, the current will be proportional to $C_1$ for every instant of time. If it is a quasi-linear one, the current will vary in accordance with the capacitance; that is, there is an exact and definite relationship between the two, though this strict instant-to-instant proportionality is not necessarily present.

Figure 6B:
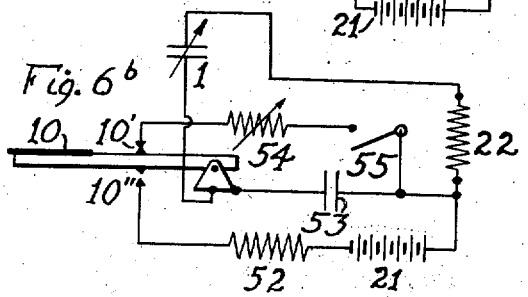

Many of the details of my invention are applicable to other forms of the parts with which they are associated. For example, a plurality of wheels, one for each fundamental, may carry fin-like electrodes similar to electrodes 31 on the belts of Fig. 10. As a second example, a plurality of condensers like that of Fig. 11b but having a sinusoidally shaped electrode 201, may be used in the circuit locations of any of the condensers 1 to 9 in Figures 1 and 5 or of 1 in Figure 6b. The rotary form of condenser obviously is applicable to a musical instrument.

This invention is not limited to the production of periodic voltages and currents; nor is it limited to the production, in separate and distinct parts, of a plurality of sinusoidal alterations with subsequent synthesis of these in an electric circuit. For it is evident that the variation of capacitance may follow a certain law as a function of time for a limited period and then, before this variation has begun to repeat itself, the moving part of the apparatus may be stopped or electrically isolated. One way of producing a capacitance change which is non-periodic and/or not the result of synthesis in individual sinusoidal components is illustrated in Fig. 11b. Except in very limited instances, however, I prefer the periodic and synthetic means for voltage generation, as earlier described.

Where the claims include a source of electromotive force, potential, or current, I do not confine myself to a single source, since it is obvious that separate polarizing or exciting sources may be used for the several condensers.

Where a claim includes "selectors," "means for selecting," or the like, I mean to include couplers, stops, keys, or similar instrumentalities, except as further limited by the language of the claim.

In those claims which include means for producing variations of current, voltage, electromotive force or potential, or means for varying a capacitance, current, electromotive force, or potential or which include similarly worded phrases, I mean to cover frequencies or waveforms corresponding to different notes of any musical scale or system of temperaments, overtones or other frequencies, or waveforms, periodic or non-periodic, musical or non-musical, except where the claims are limited by their terminology, and two or more of these of like or unlike frequencies or waveforms may be combined by selectors as above defined.

As is well known in the electrical art, a condenser consists essentially of a pair of conducting electrodes with an intervening dielectric or insulator therebetween. Hence, the intervening air or airgap in the condensers illustrated herein has necessarily to be regarded as a part of the condenser, and the claims are intended to reflect this fact.

Where the claims refer to a "condenser," the word is used in accordance with the following definition. Electrodes so remote from one another, or so situated relative to one another, that there can be no useful electrostatic flux in the dielectric between them are regarded as belonging to separate condensers. Conversely, electrodes so close together, or so situated relatively, that there may be useful flux between them are parts of the same condenser. Thus, in Figure 10 are illustrated twelve electrodes, 33. These have no useful flux between them at any time, and hence belong to twelve separate condensers.

The only useful flux present is that between a given stationary electrode 33 and that particular electrode 31 temporarily beneath it, and these two electrodes therefore belong to the same condenser for the time. When the same moving electrode 31 has progressed to another stationary electrode 33, then it and that other constitute a second condenser. Hence Figure 10 shows twelve separate condensers, while Figures 11[b] and 12 each illustrate one condenser.

When I speak in the claims of "condensers," I mean a plurality of the individual condensers as above defined.

Where I use the phrase, "substantially sinusoidal waveform" or the like, I mean a waveform which is nearly enough sinusoidal for the purpose at hand. I do not mean to include in the phrase all manner of periodic waveforms. By a "partial tone" or a "partial," I mean to imply a substantially sinusoidal waveform intended to be used as one of the components of a complex periodic waveform. By a "complex periodic waveform" in the specification and claims, I mean to include all periodic waveforms not comprehended under the above definition of a "substantially sinusoidal waveform."

Where I refer to a part of a condenser or the like as being "shaped in accordance with" a waveform, or "shaped in a manner appropriate to" a waveform or where I use similar terminology, I do not of course mean to imply that any part of said condenser, or the like, is necessarily a "photographic image" of the waveform, but only that it is of such a shape that said waveform will result from the operation of the condenser in the manner described, and that the shape is one of the factors responsible for the waveform.

Where I refer to "an electrode" or to "electrodes," I mean to include in this term only bodies, surfaces, and areas sufficiently conductive so that each of their active portions behave, for the purposes of this application, as equipotential surfaces. Bodies, surfaces, and areas such as an emulsion of silver, are not included, since they would not behave as equipotential surfaces to a degree suitable for present purposes.

In musical applications, the phase relationships between partials of a complex tone is not important, as shown by D. C. Miller, "The Science of Musical Sounds," page 62, published by the MacMillan Co., 1926. In Figure 10, the placing of the scanned electrodes will, of course, determine the phase relationships between the fundamental and its harmonics in the wave originated. In Figure 11[b], it is implicit in the shapes of the electrodes. As this relation is not important musically, exact spatial relationship of the electrodes is also not important in such applications, and no particular relationship has been disclosed in Figure 10. Thus, the use of the word, "prescribed waveform" does not necessarily carry an implication as to definite phase relationships.

Where the claims recite a "coupling element," "coupling device," or "coupling impedance," I mean to include thereby any suitable element comprising a substantial amount of impedance. Such an element may be made up of resistors, capacitors, inductors, or transformers, singly or combined in any manner suitable for coupling purposes. Simply wires, leads, or buses having no appreciable impedance are not suitable couplers because of their lack of impedance, and are not included in the phrase.

In the claims, where I refer to "continuously varying," continuous variation," "continuously moving," or the like, I mean to imply that the motion or variation is not started and stopped by selectors in the act of selecting tones, timbres, sounds, condensers, or sources, but that it continues in any actuating part, source, or condenser when the device as a whole is in use, independently of whether that particular part, source, or condenser is in use for voltage production or not and that selection, if any, is effected by establishing electric connections to a source, or condenser.

Except when further limited, as by the word "conductively" or the like, where the claims specifify means for establishing electric circuit connections or include similar phrases, I do not mean to be limited to devices which make electrical contacts such as a switch. Such devices may bring electrical parts into inductive relationship as in part 65—71 or may be otherwise inductive, and the electrical influence through such selectors may be via a solid or fluid path.

No claim is made herein to any element in the field circuit of an alternator, or the lamp-exciting circuit of a photoelectric device.

In the claims in which I use the term "network" or "circuit," I mean to cover all conductors, or electrical networks, however complex, (except where limiting words such as "series" are included) in which there can be an appreciable transfer of electric charges by metallic, galvanic, ionic, or electronic conduction; I mean to cover also such instrumentalities as condensers, transformers, and gaseous vacuum, and photoelectric tubes, in which the airgaps are so short as to connect the adjacent parts through electrostatic or magnetic induction. The terms are to distinguish from airgaps through which only an infinitesimal portion of the current can be transmitted and from those in which energy transfer occurs chiefly by electromagnetic radiation, as in wireless transmission.

Whenever, in the claims, I refer to a source of polarizing or exciting electromotive force, or the like, unless further limited, I mean to specify a source whose internal impedance and electromotive force are either substantially invariable, or else vary periodically at a rate above or below audibility. The current in such a source may, however, vary at an audible rate in response to the variations in impedance of the external circuit connected to it.

In these claims, where reference is made to "an instrument for producing alternating electric currents and voltages" or where some similar phrase is employed, it is not to be inferred that the production of alternating electric currents and voltages is the ultimate purpose of the instrument referred to. The ultimate purpose may, for example, be the production of musical sounds.

In the claims, where a part is described as moving relative to another part, it is to be understood that either or both of the parts referred to may be in motion relative to other portions of the device such, for example, as its supporting base or framework. Relative motion between the two parts is the essential feature.

The drawings and description illustrate and describe what I now consider to be preferred forms of the device for production of musical tones or of alternating currents or electromotive forces, by way of illustration only, while the broad principle of the invention will be defined by the appended claims.

What I claim is:

1. A device for originating a prescribed waveform, comprising a quasi-linear circuit, a condenser of variable capacitance in said circuit for varying the negative reactance therein and actuating means for continuously varying the capacitance of said condenser in accordance with said waveform.

2. A device for originating waveforms translatable into sound, including means for producing audio-frequency electric currents by mechanical motion between parts thereof, actuating means for maintaining said motion, and an electrical network having output terminals and a shunt branch and being fed by said first means; said branch having a negative reactance and being adapted for by-passing audio-frequency components of current and for thereby reducing the magnitude of musically objectionable harmonic currents set up by said first means across said terminals.

3. A device for originating a prescribed waveform, comprising an input network, a portion of which network has a capacitance which varies as a function of time; said capacitance characterized by the fact that its variations are small compared with its fixed component of capacitance, whereby quasi-linearity is obtained.

4. A device for originating a prescribed waveform, comprising an electric circuit, a condenser of variable capacitance in said circuit for varying the negative reactance therein, and actuating means for continuously varying the capacitance of said condenser in accordance with said waveform, and a fixed condenser in said circuit for rendering said circuit quasi-linear.

5. A device for originating a prescribed waveform, comprising an input network, means for producing audio-frequency electric currents by mechanical motion between parts thereof, actuating means for maintaining said motion, an amplifier, and a coupling device for coupling said network and amplifier; said network having a branch of negative reactance shunting said coupling device, whereby relatively high audio-frequency components of current in said coupling device which are musically objectionable may be reduced.

6. A device for originating waveforms of electric current translatable into sound, comprising an input network, a plurality of sources of such current, actuating means for producing relative rotation between parts of said sources, an amplifier having input terminals, a coupling element coupling said network and said terminals, and a plurality of circuit branches in said network conductively connecting one terminal of each of said sources to said coupling element and adapted to conduct said translatable current between said terminal and said coupling element, each of said branches including in series an impedance element and one pair of terminals of a multipole selector, and the impedance of each of said impedance elements being sufficiently great to materially limit the current through its branch; sources whose hereinbefore mentioned terminals are connected to separate branches being connected at their other terminals to a common conductor.

7. A device for originating waveforms of electric current translatable into sound, comprising an input network, a plurality of sources of such current, actuating means for producing relative rotation between parts of said sources, an amplifier having input terminals, a coupling element coupling said network and said terminals, and a plurality of circuit branches in said network conductively connecting one terminal of each of said sources to said coupling element and adapted to conduct said translatable current between said terminal and said element, each of said branches including in series an impedance element and one pair of terminals of a multipole selector; sources whose hereinbefore mentioned terminals are connected to separate selectors being connected at their other terminals to a common conductor; said network comprising, upon closure of selectors therein, a plurality of circuit meshes, each of which meshes contains one of said sources; at least a part of said coupling element, and one of said impedance elements; the impedance of the impedance element in each of said meshes being materially greater than the impedance of the remainder of said mesh.

8. A condenser for originating a prescribed waveform, comprising a plurality of electrodes adapted to set up an electrostatic field around and between them, parts of said condenser adapted to have relative motion, and a guard electrode for modifying said field.

9. A variable condenser, comprising an electrode, a guard electrode, and a strongly resonant vibratile member distinct therefrom for varying the capacitance of said condenser.

10. A device for originating a prescribed waveform, comprising parts having continuous relative motion between them, driving means for obtaining said motion, and means for superimposing upon said motion an additional component of motion at a slow periodic rate, whereby vibrato effects are producible.

11. A device for originating a waveform of electric current, comprising parts having continuous relative motion between them, driving means for obtaining said motion, and means which include a periodically varying mechanical impedance for superimposing upon said motion an additional component of motion at a subaudible frequency, whereby vibrato effects are producible.

12. A device for originating waveforms which comprises an electrical network and a tremolo actuating means; said network including an input portion and a vacuum-tube system receiving from said portion varying electromotive force translatable into sound; in said portion, means for producing audio-frequency variations of current in said system, and a pair of contacts alternately opened and closed by said actuating means at a subaudible rate, whereby corresponding variations of current result in a tremolo effect.

13. A device for originating waveforms, including a tremolo-actuating means and an electrical network; said network comprising an input portion, a vacuum-tube system, and a coupling element coupling said portion and the input terminals of said system; said portion including means for producing audio-frequency variations of current therein and a circuit branch shunting at least a portion of said element and external to said means, whose impedance is varied by said actuating means; the voltage fed to said terminals by said portion being modulated by the variations of said impedance at a subaudible frequency, whereby tremolo effects are produced in the output of said system.

14. A device for originating waveforms, comprising an electrical network and sources in said network for producing audio-frequency variations of current therein; said network containing a pair of electrical contacts alternately opened and closed at a slow periodic rate for the production of tremolo effects upon the variations of current from a plurality of said sources, said contacts when open having impressed across them by said sources a variable potential translatable into sound.

15. A device for originating a waveform comprising an electrical network, and means for producing in said network audio-frequency variations of current; in said network a coupling element and a tremolo circuit branch external to said means having an impedance which varies at a slow periodic rate, and shunted across at least a portion of said coupling element.

16. A device for originating waveforms translatable into sound, comprising a plurality of condensers, actuating means for varying the capacitances of said condensers in accordance with said waveforms, a source of electromotive force for polarizing said condensers, and timbre control means adapted to control the polarizing potentials applied to said condensers by said source; said timbre control means comprising a plurality of timbre selectors, a plurality of buses each individual to a given partial and common to that partial at a plurality of pitches in a musical scale, and a plurality of impedance elements individual to each of said buses for determining the polarizing potential on each of said buses.

17. A device for originating waveforms comprising a plurality of sources of varying electric currents translatable into sound, a coupling element, a plurality of selectors, means actuated by said selectors and adapted to complete circuit connections for conveying said varying currents between said sources and said element, and means actuated by each of said selectors for preventing musically objectionable current components in said element by short-circuiting a current path joining one of said sources and said element when it is desired that that source shall produce no current in said element by that path.

18. A device for originating a waveform, comprising a vacuum-tube system, an input circuit adapted to be connected to the input terminals of said system, a condenser of variable capacitance adapted to vary the negative reactance in said circuit and to thereby produce across said terminals a voltage translatable into sound, actuating means for continuously varying the capacitance of said condenser in accordance with said waveform, an impedance element, and electrical means in said circuit for gradually inserting said element into said circuit and for thereby gradually varying the effect of said condenser upon said circuit and said system in a manner substantially free from musically objectionable transients.

19. A device for originating a waveform translatable into sound, comprising an electric circuit, means for producing current variations in said circuit, electrical selectors for selecting said means, and means for sustaining said sound by controlling the rate of variation of an impedance in said circuit external to said first means after said selectors have ceased to move.

20. A device for originating waveforms of varying electric current translatable into sound, comprising a vacuum-tube system, a plurality of electrostatic condensers whose capacitances vary at the frequencies of a musical scale for producing current variations in said vacuum-tube system, mechanical means for continuously varying said capacitances, electrical selectors, circuit branches selectively closable by said selectors between terminals of said condensers and terminals of said system, and adapted to convey said translatable current between terminals of said condensers and said system, a sound translating device excited by said system, variable impedance means for rendering gradual the onset of tones when said selectors are operated, and means for sustaining tones when said selectors are released.

21. In an electrical instrument an electrical network having therein a plurality of means for producing audio frequency variations of current, a plurality of groups of selectors, and a frequency-selective volume control individual to each of said groups.

22. In a system for the production of music, a source of constant potential, a plurality of rotatably driven means for electrostatically producing varying potentials at selected tone frequencies, electrostatic means for determining the manner in which said varying potential varies for producing tones of various timbres, a sound producing circuit, means for impressing potentials at selected tone frequencies derived from said rotatably driven means and of selected tone timbres derived from said timbre determining means upon said sound producing circuit, and means for prolonging the duration of the tones emitted by said sound producer.

23. In a system for the production of music, a multiplicity of continuously varying capacitative reactance of differing characteristics, means for simultaneously operating said varying capacitative reactances for producing different tone pitches, an electron tube system having input and output circuits, a sound producer connected with said output circuit, a plurality of tone pitch selectors, a variable impedance adapted to be varied by each of said selectors for rendering selected capacitative reactances effective with respect to said electron tube system for correspondingly controlling the operation of said sound producer, and means adapted to control and inhibit the variation of said impedances and to correspondingly control the time interval during which one or more of said capacitative reactances remain effective with respect to said electron tube system.

24. In a system for electrically producing sound, an electromagnetic sound producer, an electrical circuit for controlling the electromagnetic sound producer, a multiplicity of continuously varying capacitive reactances for controlling the operation of said circuit, a plurality of tone selectors, in said circuit a plurality of circuit branches each selectively closable by one of said selectors, and means adapted to control and inhibit the reopening of said branches and to correspondingly prolong the time period over which one or more of said continuously varying capacitive reactances control said circuit.

25. An electrical musical instrument for originating prescribed waveforms translatable into sound, comprising: a plurality of condensers, actuating means for continuously varying the capacitances of said condensers in accordance with said waveforms, a sound translating circuit adapted to be energized from said condensers and to translate said waveforms into sound, a plurality of keys, selecting means actuated by said keys for sustaining said sound at gradually diminishing volume, and a speed control member other than said keys and said means for regulating, during performance on said instrument, the motion of said selecting means and the rate of diminution of said volume.

26. In an electrical musical instrument: an input network; a sound translating network; in said input network, a condenser of variable capacitance; a tone selector adapted to impose the effect of said condenser upon said network; actuating means for continuously varying the capacitance of said condenser to originate a waveform of current translatable into a musical tone; in said condenser, a pair of electrodes maintained in relative motion by said means; in said input network, a coupling impedance adapted to couple together said input network and said translating network, a source of polarizing potential for said condenser, and circuit elements connecting together said pair of electrodes, said impedance, and said source in series.

27. In an electrical musical instrument: an input network; in said network, a condenser of variable capacitance for originating a varying potential translatable into a musical tone; a tone selector adapted to impose the effect of said condenser upon said network; actuating means for continuously varying said capacitance; a translating network adapted to be energized by said potential; a source of potential of supersonic frequency for polarizing said condenser; and means connectible between said input and translating networks for demodulating said potential.

28. In an electrical musical instrument: a vacuum tube system; an input network adapted to be connected to the input terminals of said system; a source of variable electromotive force translatable into sound; means for continuously actuating said source; a tone selector for said source; and a variable resistor in said network and controlled by said selector for gradually varying the effect of said source upon said network and said system.

29. In a device for originating a prescribed waveform: an electrical network; means electrically connected in said network for producing current variations therein; and electrical means for selecting said first means and for gradually varying its effect upon said network, said electrical means comprising a pair of electric contacts, a condenser of variable capacitance, and a common mechanism for operating said contacts and for varying said capacitance.

30. In an electrical musical instrument: an electrical network; in said network, a plurality of generators of electric currents translatable by said network into musical tones at a plurality of frequencies in a musical scale; and, in said network, the combination of a plurality of circuit branches, a plurality of electrical conductors, and a plurality of current-limiting impedance elements individual to each of said conductors and adapted to be connected thereto; each of said conductors together with its associated impedance elements being connected during operation of said instrument through certain of said branches to other portions of said network to conduct currents originating at those generators which supply an individual tonal component at a plurality of said frequencies and being adapted to determine the strength of said component at a plurality of said frequencies simultaneously.

31. In an electrical musical instrument: an electrical network; in said network, a plurality of generators of electric currents translatable by said network into musical tones at a plurality of frequencies in a musical scale; a plurality of timbre selectors; and, in said network, a plurality of current-limiting impedance elements each individual to one of said selectors and selectively connectible by said selector to other portions of said network to determine the strength of a given component of a musical tone at a plurality of said frequencies simultaneously.

32. In a device for originating waveforms translatable into sound: a plurality of condensers each having two terminals; a plurality of selectors for said condensers; actuating means for continuously varying the capacitances of said condensers in accordance with said waveforms; a source of polarizing electromotive force for said condensers; a coupling impedance having a plurality of terminals; circuit elements connecting said source with a terminal of said impedance and a terminal of each of said condensers; and a plurality of circuit branches selectively closable by said selectors between a terminal of said impedance and a terminal of one of said condensers, the terminals connected to said branches being other than those connected to said source.

33. In an electrical musical instrument: an electrical network; in said network, a plurality of generators of electric currents translatable by said network into musical tones at a plurality of frequencies in a musical scale, each of said generators being of the type in which the amplitude of its translatable current may be controlled by the value of an exciting potential impressed upon it; in said network, a source of exciting potential for said generators; and, connected in said network intermediate said source and said generators, the combination of a plurality of circuit branches, a plurality of electrical conductors, and a group of current-limiting impedance elements individual to each of said conductors; each said group of impedance elements being connected between their associated conductor and terminals of said source to determine the magnitude of exciting potential applied to their associated conductor; and each of said conductors being connected during operation of said instrument through certain of said branches to generators which supply a given tonal component at a plurality of said frequencies and being adapted to determine the strength of said component at a plurality of said frequencies simultaneously.

34. In an electrical musical instrument: an electrical network; in said network, a plurality of condensers, and a source of polarizing potential for said condensers; actuating means for varying the capacitances of said condensers in accordance with tones of a musical scale: a plurality of means for selecting said condensers and for imposing their combined effects upon said network, each of said means for selecting comprising a plurality of pairs of switch contacts, a common control member for simultaneously closing said contacts and, in series with each pair, a terminal and a voltage dividing resistor; each of said resistors and pairs being individual to its respective control member; said terminals each being connectible to said source through a plurality of current paths, each path comprising one of said resistors and one of said pairs; the plurality of pairs through which a given terminal is connected being controlled by separate control members; the polarizing connections for said condensers each being made to one of the aforementioned terminals and to a point on said source; the potential of each of said terminals being determined by the operation of said control members; said plurality of means comprising a plurality of additional current paths, each connecting one of said terminals with a common terminal of said source, each of said last-named paths comprising a voltage-dividing resistor, and not being adapted for closure by any of the control members; said pairs, terminals, and resistors being included in said network.

RAYMOND C. FISHER.